April 29, 1941.　　　　L. W. WELCH　　　　2,240,062
HEATING APPARATUS FOR MOTOR VEHICLES
Filed Dec. 18, 1939　　　5 Sheets-Sheet 1
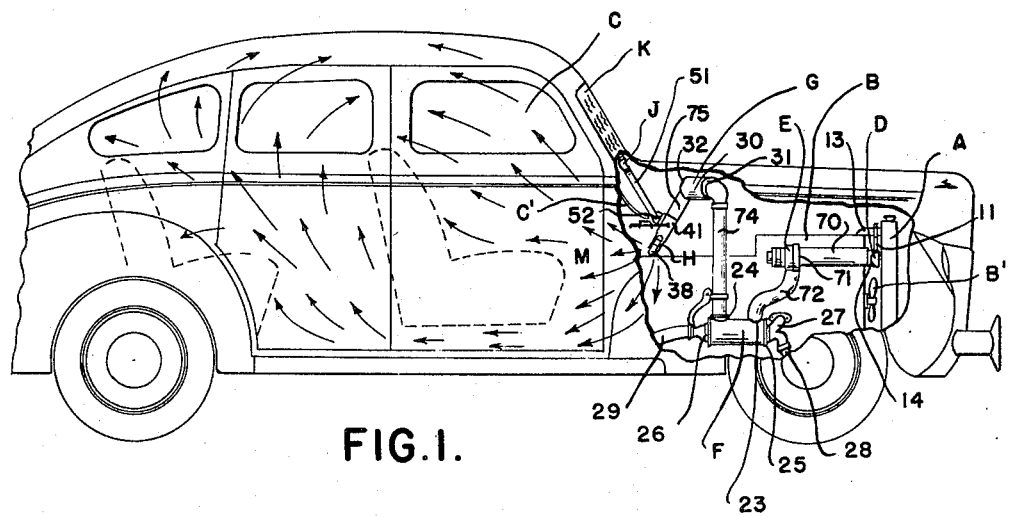
INVENTOR.
LEWIS W. WELCH
BY
ATTORNEYS April 29, 1941.  L. W. WELCH  2,240,062
HEATING APPARATUS FOR MOTOR VEHICLES
Filed Dec. 18, 1939  5 Sheets-Sheet 2

INVENTOR.
LEWIS W. WELCH
BY
ATTORNEYS

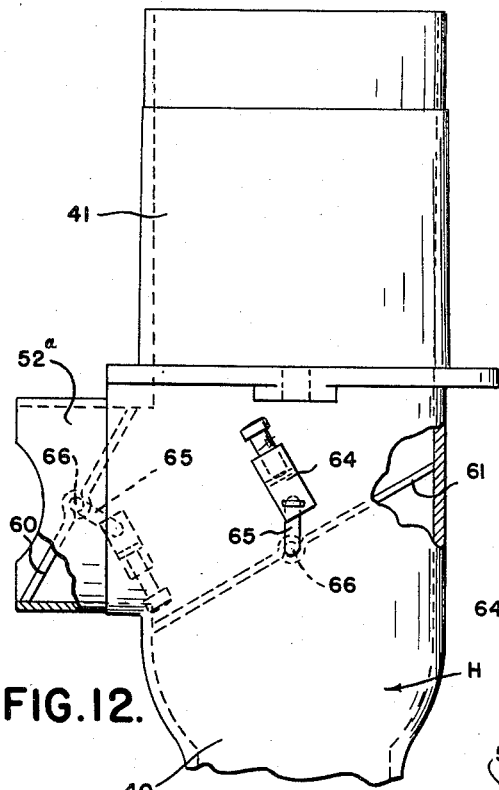
FIG.12.
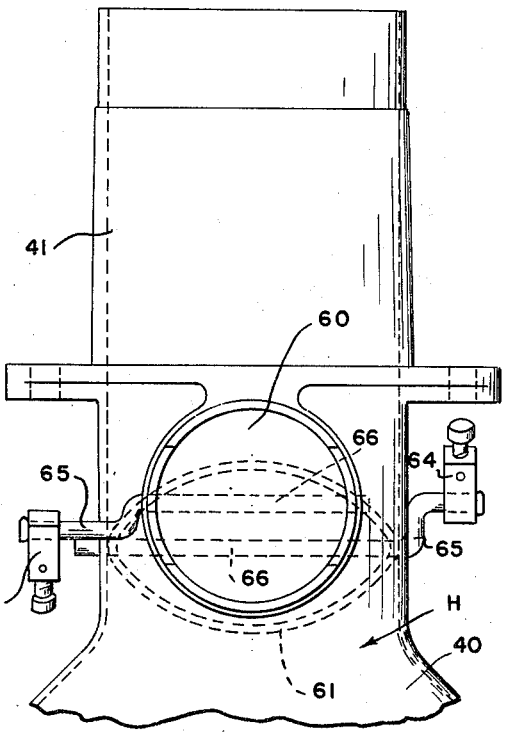
FIG.13.
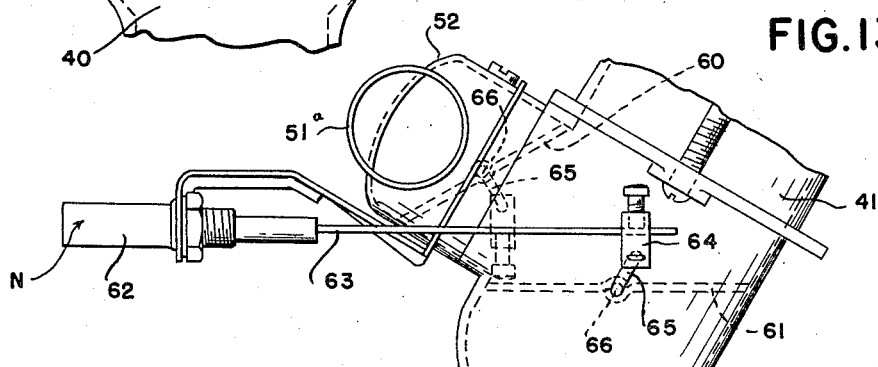
FIG.18.
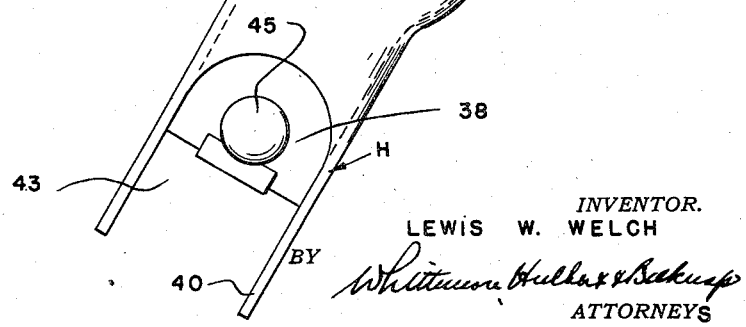
INVENTOR.
LEWIS W. WELCH
BY
ATTORNEYS April 29, 1941.  L. W. WELCH  2,240,062
HEATING APPARATUS FOR MOTOR VEHICLES
Filed Dec. 18, 1939   5 Sheets-Sheet 4
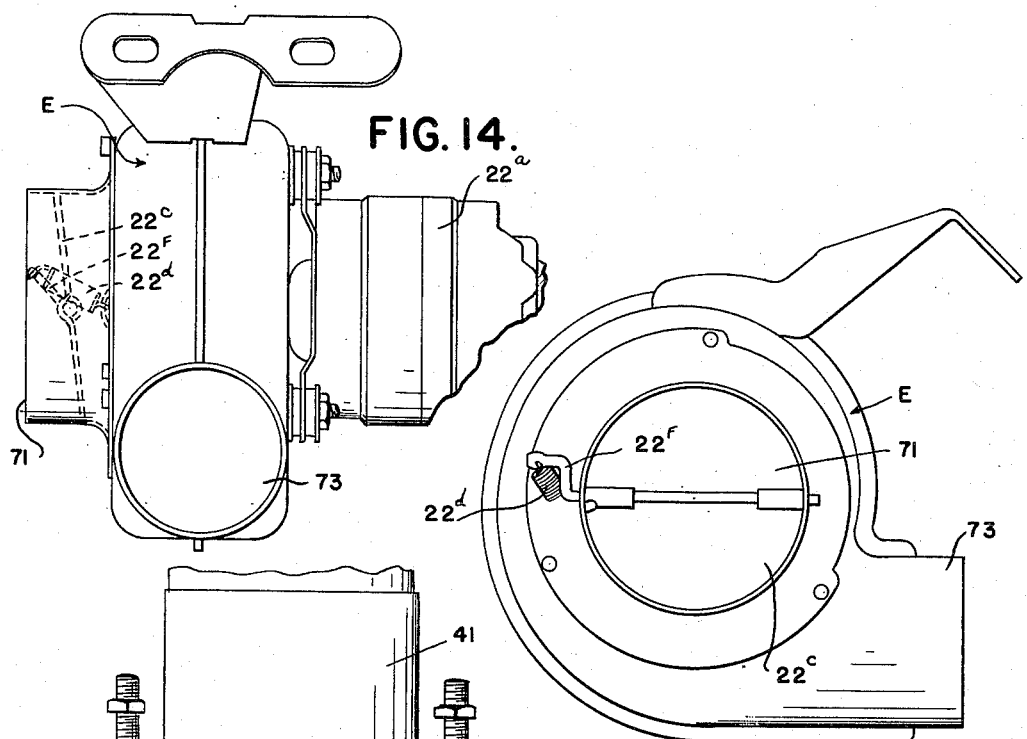
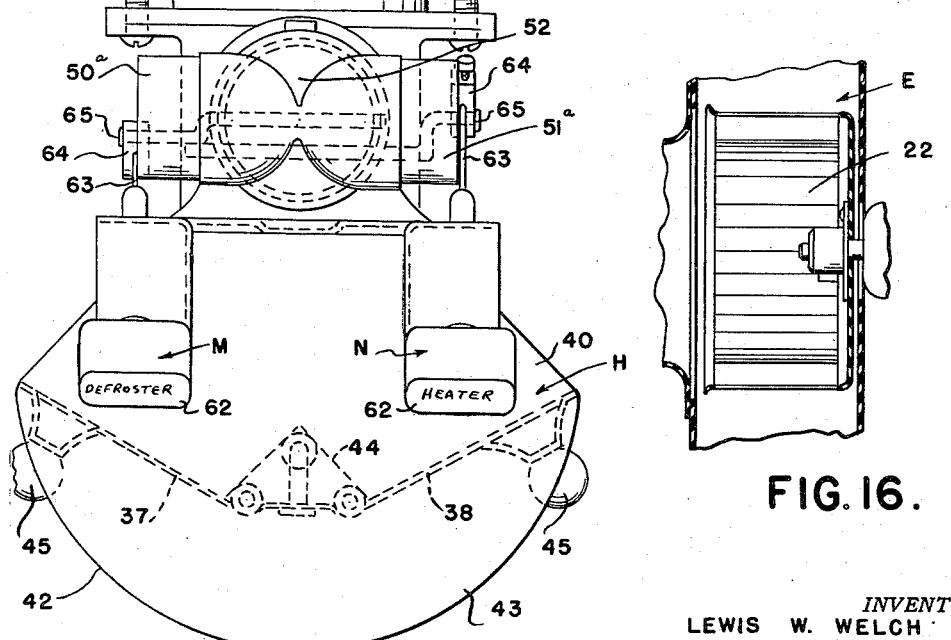
INVENTOR.
LEWIS W. WELCH
BY
ATTORNEYS

INVENTOR.
LEWIS W. WELCH

Patented Apr. 29, 1941

2,240,062

UNITED STATES PATENT OFFICE 2,240,062

HEATING APPARATUS FOR MOTOR VEHICLES

Lewis W. Welch, Detroit, Mich., assignor to Novi Equipment Company, Novi, Mich., a corporation of Michigan Application December 18, 1939, Serial No. 309,912

4 Claims. (Cl. 237—12.3)

This invention relates generally to heating apparatus for motor vehicles and refers more particularly to an apparatus wherein air from the atmosphere may be heated and delivered for heating purposes to the windshield and interior of the vehicle body.

One of the essential objects of the invention is to provide an apparatus of the type mentioned wherein the air from the atmosphere is initially heated by the hot water in the radiator of the vehicle and is subsequently heated by the exhaust gases from the engine, before it is delivered to the parts mentioned.

Another object is to provide an apparatus wherein a blower is utilized to draw the air through the radiator and to force it through the exhaust heater to suitable air outlets at the points mentioned.

Another object is to provide an apparatus wherein a filter is employed in advance of the blower to cleanse the air that has been heated by the radiator.

Another object is to provide an apparatus wherein a silencer is used in the warm air conduit between the main heater and the vehicle body to deaden or shut out noises from the vehicle engine and blower.

Another object is to provide the apparatus with a simplified control mechanism for regulating the flow of air to the windshield and to the interior of the vehicle body.

Another object is to provide an apparatus having a two-vent register provided with individually operated deflectors for directing the warm air toward the driver and adjacent passenger of the vehicle.

Another object is to provide an apparatus having dual outlets for directing warm air against the windshield to prevent ice, snow, sleet, frost, etc., from collecting thereon.

Another object is to provide an apparatus wherein the blower is sufficiently large to provide approximately enough warm air within the vehicle body for a complete change every minute.

Other objects, advantages and novel details of construction of this invention will be made more apparent as this description proceeds, especially when considered in connection with the accompanying drawings, wherein:

Figure 1 is a phantom view of a motor vehicle and showing heating apparatus embodying my invention applied thereto;

Figure 2 is a top plan view of the shroud;

Figure 3 is a sectional view taken substantially on the line 3—3 of Figure 2;

Figure 5 is a sectional view taken on the line 5—5 of Figure 4;

Figure 12 is a side elevation of the register body, with parts broken away and in section;

Figure 13 is a plan view of the structure illustrated in Figure 12;

Figure 14 is a side elevation of the blower assembly;

Figure 15 is an end elevation of the construction shown in Figure 14;

Figure 16 is a vertical sectional view through the blower assembly;

Figure 17 is a top plan view of a portion of the register assembly;

Figure 18 is a side elevation of the structure illustrated in Figure 17;

Figure 6:
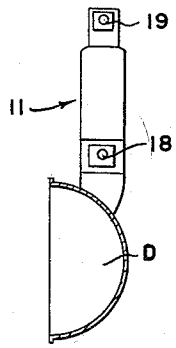
Figure 6 is a sectional view taken on the line 6—6 of Figure 5.
Figure 4:
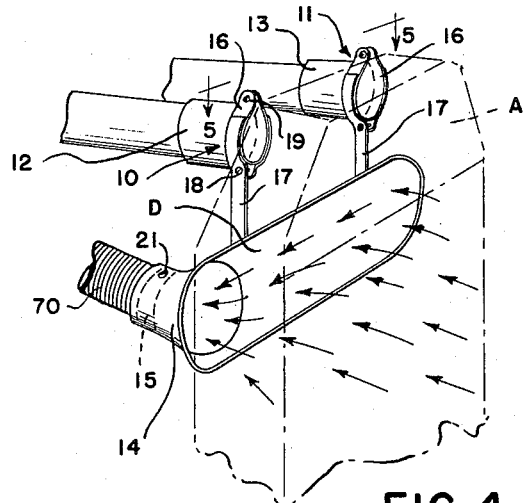
Figure 4 is a fragmentary perspective view of a motor vehicle engine and radiator and showing a portion of my heating apparatus applied thereto.

Referring now to the drawings, A is the radiator, B is the engine, and C is the body of a conventional design of automobile.

My heating apparatus includes an air intake shroud D, blower E, main heater F, silencer G, air register H for the interior of the vehicle body, and hot air outlets I and J, respectively, for the windshield K.

As shown, the shroud D is in the form of an elongated trough of circular cross section and opens toward the rear face of the radiator A so as to catch air discharged therefrom. Preferably this shroud extends horizontally across the rear face of the radiator adjacent its upper end so as to be at the hottest part thereof. In the present instance this shroud is located above the regular engine fan B' and is supported by suitable brackets 10 and 11 from the laterally spaced water hose 12 and 13 of the motor vehicle. Such shroud is provided at one end with a rearwardly projecting tubular portion 14 containing a suitable filter 15 for the air. Preferably each bracket consists of a sectional collar 16 and a supporting arm 17. By referring to Figure 5 it will be noted that the sections of each collar are held in clamped position on the hose by suitable bolts 18 and 19, while each supporting arm 17 is preferably integral with one of said collar sections and has an attaching portion 20 welded or otherwise rigidly secured to the shroud D.

The filter 15 may be any suitable material for cleaning the air and is preferably held in place by suitable screws 21.

The blower E is preferably in substantially horizontal alignment with the tubular portion 14 of the shroud and has a rotary fan 22 driven by an electric motor $22^a$ operatively connected to the electric wiring system of the motor vehicle. An electric switch $22^b$ in circuit with the motor $22^a$ and wiring system of the vehicle is provided on the instrument panel C' of the vehicle body to control the operation of the fan 22. For warm weather driving I have provided a valve $22^c$ for cutting off communication between the shroud D and heater F. As shown, this valve $22^c$ is on the inlet side of the blower and is normally held open by a coil spring $22^d$. When the crank $22^f$ to which the spring $22^d$ is connected is manually swung across dead center, then the spring $22^d$ will hold the valve $22^c$ in closed position.

The main heater F may be any suitable construction such as that illustrated in Welch et al. Serial No. 205,576 and is located below and somewhat to the rear of the blower E. Preferably the air inlet 23 and air outlet 24 are spaced apart longitudinally of the heater F at the top thereof, while the inlet 25 and outlet 26 for the exhaust gases are at opposite ends of the heater. As the engine is of conventional V-shape and has two exhaust manifolds, one at each side of the engine, I provide a fitting 27 and tubing 28 for conducting the exhaust gases from the exhaust manifolds of the engine to the gas inlet 25 of the heater, and provide tubing 29 for conducting the exhaust gases away from the gas outlet 26 of the heater to the rear of the automobile.

The silencer G may be any suitable construction to deaden or shut off noise and is preferably located above and slightly to the rear of the heater F. Preferably this silencer G has an outer shell 30 provided at opposite ends thereof with an inlet 31 and outlet 32 for air and has an apertured or perforated inner shell 33 spaced from the outer shell. Suitable sound absorbing or deadening material 34 such as rockwool is located between the inner and outer shells.

Figure 9:
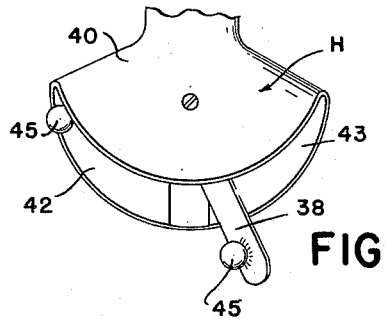
Figures 9, 10 and 11 are perspective views of the hot air register, showing the deflectors or shutters thereof in various positions.
Figure 7:
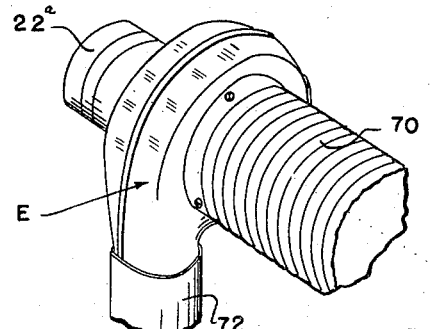
Figure 7 is a perspective view of another portion of my heater structure.
Figure 10:
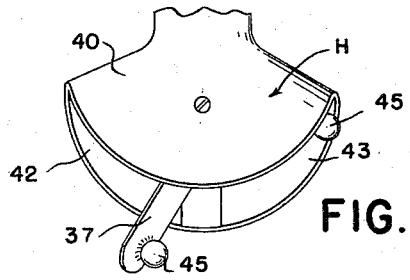
Figure 11:
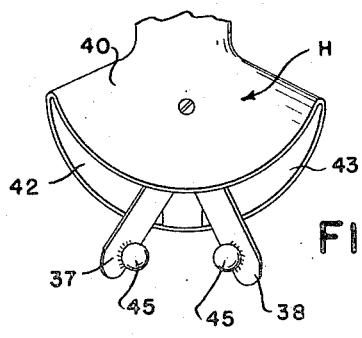

The air register H for the interior of the vehicle body is located at a predetermined angle under the instrument panel C' of the vehicle body and has individual doors or deflectors 37 and 38, respectively, for controlling the flow of warm air toward the driver and adjacent passenger of the motor vehicle. As shown, the body of the register has a segmental or fan-shaped outlet portion 40 and a tubular inlet portion 41 for air. Preferably there are two laterally spaced outlets 42 and 43 for air in the curved forward edge of the outlet portion 40 of the register. The deflectors or doors 37 and 38 are so mounted in the outlet portion 40 that air may be discharged through outlet 42 only as in Figure 10; through outlet 43 only as in Figure 9; or, through both outlets 42 and 43 as illustrated in Figure 11. Preferably the doors or deflectors 37 and 38 are pivotally mounted at their inner ends to a substantially triangular-shaped block 44 within the body 40 and are provided at their outer ends with suitable knobs or finger pieces 45 by which they may be manipulated.

Figure 8:
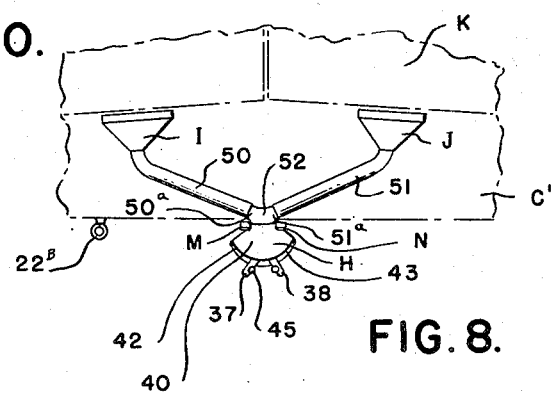
Figure 8 is a front elevation of the heater structure leading to the windshield of the automobile.
Figure 19:
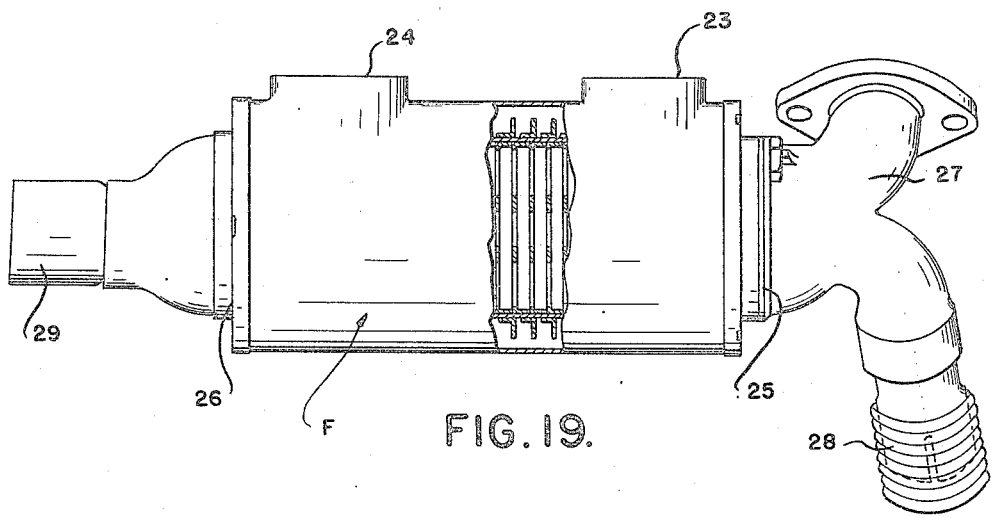
Figure 19 is a side elevation, partly in section, of the main heater assembly.
Figure 20:
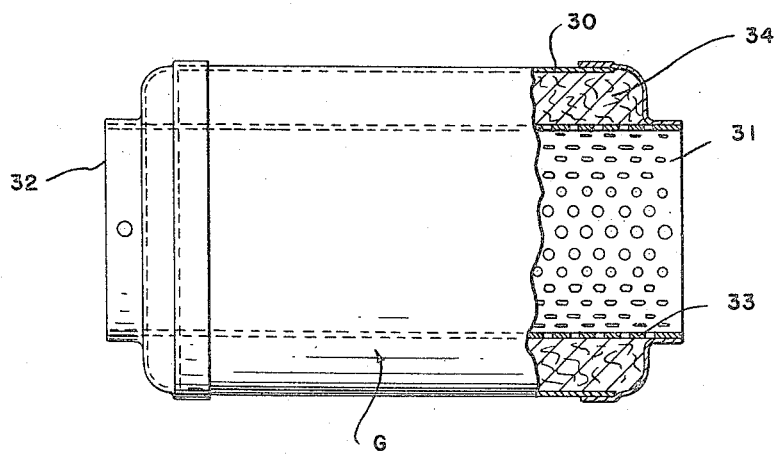
Figure 20 is a side elevation, partly in section, of the silencer assembly.

The hot air outlets I and J for the windshield are illustrated in Figure 8 and constitute dual defrosters to keep the windshield free of ice, sleet, snow, etc. As shown, these outlets are substantially triangular-shaped heads for branch supply tubes 50 and 51 that lead upwardly from lateral air outlets $50^a$ and $51^a$ of a T-fitting 52 mounted on a laterally projecting tubular part $52^a$ of the register body. A suitable valve 60 controls the discharge of warm air from the tubular inlet 41 of the register through the fitting 52 to the branch supply tubes 50 and 51, while a suitable valve 61 controls the discharge of warm air from the tubular inlet portion 41 to the outlet portion 40 of the register. Any suitable controls such as M and N, respectively, may be provided adjacent the register H for operating the valves 60 and 61. As shown, these controls consist of horizontally mounted slidable finger pieces 62 having forwardly extending shanks 63 adjustably connected to binding posts 64 carried by crank portions 65 of the valve pivots 66.

In the present instance a tube 70 extends from the tubular part 14 of the shroud D to the air inlet 71 of the blower. A tube 72 extends from the air outlet 73 of the blower to the air inlet 23 of the heater F, and a tube 74 extends from the air outlet 24 of the heater F to the air inlet 31 of the silencer G. A tube 75 extends from the air outlet 32 of the silencer to the tubular air inlet 41 of the register H.

Thus, from the foregoing, it will be apparent that the regular fan B' of the engine located below the shroud D and having a greater capacity than the blower E will draw any foul matter in the air below the shroud and will blow same outwardly through the usual louvers in opposite sides of the hood. Hence, fresh air will be received by the shroud D above the engine fan and will be circulated through the heating apparatus. The air picked up by the shroud D is not only fresh but is heated by water in the radiator A. In fact, the shroud picks up heated air from the hottest part of the radiator A. Such air is then filtered by the body 15 of filtering material and is heated further by the main heater F before it is discharged from register H and outlets I and J.

Since the air received by the shroud D is preheated by the hot water in the radiator A, it will be apparent that it will require less time for the main heater F to heat such air to the desired temperature. Thus, the main heater F will heat faster to the desired temperature the air that is to be supplied to the interior of the body C or to the windshield K, or both, as desired.

In the present instance the blower E is relatively large and has sufficient capacity to deliver approximately enough warm air to the vehicle body for a complete change every minute, thus it will be appreciated that the volume of warm air supplied to the interior of the vehicle body and to the windshield is extremely large. Should it be desired to cut off the supply of warm air to the windshield K, the control M for the valve 60 may be operated. Should it be desired to cut off the supply of warm air to the interior of the vehicle body, the control N for the valve 61 may be operated. Due to the angle of the register H, the warm air discharged into the vehicle body C will circulate around the interior of the vehicle body as indicated by the arrows in Figure 1. Thus, a complete warm air circulation is assured. When the vehicle is in a position to travel 35 miles per hour or faster, for example, on an open road, the air from the atmosphere picked up by the shroud D will circulate sufficiently through the heating apparatus to warrant turning off the motor 22ª of the blower. Thus, the battery of the vehicle with which the motor is electrically connected will be relieved accordingly.

During warm weather the valve 22ᶜ may be closed to shut off communication between the tube 70 and the blower E.

What I claim as my invention is:

1. In an air heating apparatus for a motor vehicle having an internal combustion engine provided with an exhaust manifold, and a water circulating system including a radiator in front of the engine, and laterally spaced substantially horizontal hose projecting rearwardly from said radiator at its upper end toward said engine; an air heater operatively connected to the exhaust manifold and adapted to be heated by exhaust gases from the engine, and means for conducting to the heater air that has been initially heated by hot water in the radiator, including an elongated trough-shaped member suspended from the laterally spaced hose and extending across substantially the full width of the back of the radiator adjacent the upper end thereof, the open side of the trough being free of but disposed substantially against the back of the radiator so as to receive heated air directly therefrom, the closed side of the trough being provided at one end with an outlet for heated air, a blower beside the engine substantially in horizontal alignment with the trough-shaped member, and tubing for the heated air extending from the outlet of the trough-shaped member to the blower and from the latter to the heater.

2. In an air heating apparatus for a motor vehicle having an internal combustion engine provided with an exhaust manifold, a water circulating system including a radiator in front of the engine, and a fan between the engine and radiator at approximately the center of the latter; an air heater operatively connected to the exhaust manifold and adapted to be heated by exhaust gases from the engine, and means for conducting to the heater air that has been initially heated by hot water in the radiator, including an elongated trough-shaped member extending across substantially the full width of the back of the radiator at a point above the fan, the open side of the trough being free of but disposed substantially against the back of the radiator so as to receive heated air directly therefrom, the closed side of the trough being provided at one end with an outlet for heated air, a blower beside the engine substantially in horizontal alignment with the trough-shaped member, and tubing for the heated air extending from the outlet of the trough-shaped member to the blower and from the latter to the heater, the fan having a greater capacity than the blower so that any foul matter in the air drawn rearwardly by the fan from the radiator will be directed beneath and away from the trough-shaped member.

3. In an air heating apparatus for a motor vehicle having an internal combustion engine provided with an exhaust manifold, a water circulating system including a radiator in front of the engine, and laterally spaced substantially horizontal hose projecting rearwardly from said radiator at its upper end toward said engine, and a fan between the engine and radiator at approximately the center of the latter; an air heater operatively connected to the exhaust manifold and adapted to be heated by exhaust gases from the engine, and means for conducting to the heater air that has been initially heated by hot water in the radiator, including an elongated trough-shaped member extending across substantially the full width of the back of the radiator adjacent the upper end thereof at a point above the fan, the open side of the trough being free of but disposed substantially against the back of the radiator so as to receive heated air directly therefrom, the closed side of the trough being provided at one end with an outlet for heated air, a blower beside the engine substantially in horizontal alignment with the trough-shaped member, tubing for the heated air extending from the outlet of the trough-shaped member to the blower and from the latter to the heater, the fan having a greater capacity than the blower so that any foul matter in the air drawn rearwardly by the fan from the radiator will be directed beneath and away from the trough-shaped member, and a supporting connection between the trough-shaped member and nose including upright arms rigid with and projecting upwardly from the closed side of the trough-shaped member at spaced points longitudinally thereof and suspended from the hose.

4. In an air heating apparatus for a motor vehicle having an internal combustion engine, a radiator therefor, and water hose extending between said radiator and engine; a shroud suspended from said hose at the back of the radiator for receiving directly from the radiator air heated thereby, said shroud comprising an elongated trough-shaped member extending crosswise of the back of the radiator at the upper end thereof, the open side of the trough being free of but substantially against the back of the radiator, the closed side of the trough being provided at one end only with an outlet for heated air, an air heater operatively connected to a part of the engine to be heated thereby, and means including a blower for conducting heated air from the outlet of the suspended trough-shaped member to said heater to be heated further thereby.

LEWIS W. WELCH.